(12) United States Patent
Gordon et al.

(10) Patent No.: US 10,536,450 B2
(45) Date of Patent: Jan. 14, 2020

(54) PERSONAL IDENTIFIER SIGN-IN FOR ORGANIZATIONAL USERS

(71) Applicant: Microsoft Technology Licensing, LLC, Redmond, WA (US)

(72) Inventors: Ariel Gordon, Kirkland, WA (US); Sarat Chandra Subramaniam, Bellevue, WA (US); Ben Vincent, Kirkland, WA (US); Paul Garner, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 151 days.

(21) Appl. No.: 15/490,657

(22) Filed: Apr. 18, 2017

(65) Prior Publication Data

US 2018/0302392 A1 Oct. 18, 2018

(51) Int. Cl.
| | |
|---|---|
| *H04L 29/06* | (2006.01) |
| *G06F 21/31* | (2013.01) |
| *G06F 21/41* | (2013.01) |
| *H04W 4/14* | (2009.01) |
| *H04L 29/08* | (2006.01) |

(52) U.S. Cl.
CPC .......... *H04L 63/083* (2013.01); *H04L 67/146* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 9,378,356 B2 | 6/2016 | Rockwell | |
| 10,044,723 B1* | 8/2018 | Fischer | H04L 63/102 |
| 2012/0122497 A1 | 5/2012 | Huang et al. | |
| 2014/0053250 A1 | 2/2014 | Wethington et al. | |
| 2014/0068746 A1 | 3/2014 | Gonzalez Martinez et al. | |
| 2014/0181992 A1* | 6/2014 | Janson | G06F 21/60 726/27 |

(Continued)

OTHER PUBLICATIONS

"Sign in With Phone Number—Fabric for Android documentation," https://docs.fabric.io/android/digits/sign-in-with-phone-number.html, Retrieved on: Feb. 28, 2017, 6 pages.

(Continued)

*Primary Examiner* — Alexander Lagor (57) ABSTRACT

A method and system performed by a computing system for signing in using personal identifiers input via a sign-in portal that supports multiple tenants is provided. The system receives a sign-in request for a user that includes a personal identifier. The personal identifier uniquely identifies a person but does not include an identification of a tenant. The system performs a verification based on the personal identifier to authenticate the user. The system identifies, from a mapping, a tenant to which the personal identifier is mapped. The mapping maps personal identifiers of users to tenants. The system retrieves, from a user store for the tenant, user information relating to the user. The system then creates a security token based on the user information. If verification of the user was successful, the system sends the security token to the sign-in portal as evidence that the user has been authenticated.

18 Claims, 5 Drawing Sheets

(56) References Cited

U.S. PATENT DOCUMENTS

| | | | | |
|---|---|---|---|---|
| 2014/0215595 A1* | 7/2014 | Prasad | ................... | G06F 21/41 |
| | | | | 726/8 |
| 2014/0259190 A1 | 9/2014 | Kiang et al. | | |
| 2017/0230368 A1* | 8/2017 | Khan | ...................... | H04L 63/18 |
| 2018/0046586 A1* | 2/2018 | Venkatesh | ............... | H04L 63/08 |

OTHER PUBLICATIONS

Gremban, Kelly, "Manage your settings for two-step verification," https://docs.microsoft.com/en-us/azure/multi-factor-authentication/end-user/multi-factor-authentication-end-user-manage-settings, Published on: Feb. 23, 2017, 4 pages.

"Authenticate users with a one-time code via SMS in a Regular Web App," https://auth0.com/docs/connections/passwordless/regular-web-app-sms, Retrieved on: Feb. 28, 2017, 10 pages.

Marott, Fosco, "Phone-Based Login, Can You Dig It?", http://blog.parse.com/announcements/phone-based-login-can-you-dig-it/, Published on: May 15, 2015, 5 pages.

Kuznetsova, Olga, "Grow Your App with Account Kit: Give People New Ways to Log in," https://developers.facebook.com/blog/post/2016/04/12/grow-your-app-with-account-kit/, Published on: Apr. 13, 2016, 2 pages.

Gordon, Ariel et al., "Organizational Sign-In Across Sovereign Environments," filed with the USPTO on Apr. 18, 2017.

Knight, Shawn, "Digits could replace username passwords with mobile phone numbers—TechSpot", Retrieved From https://www.techspot.com/news/58540-digits-could-replace-usernames-passwords-mobile-phone-numbers.html, Oct. 22, 2014, 7 Pages.

"International Search Report & Written Opinion Issued in PCT Application No. PCT/US2018/026364", dated Jun. 5, 2018, 12 Pages.

* cited by examiner

110

Sign in 111 user: ______________________

112 password: ______________________

113 organization: ______________________

119
submit

120

Sign in 121 user: ______________________

122 password: ______________________

129
submit

130

Sign in 131 verification code: ______________________

139
submit

PERSONAL IDENTIFIER SIGN-IN FOR
ORGANIZATIONAL USERS

BACKGROUND

Many applications, or more generally services, maintain accounts for users. For each account, a service typically maintains a separate set of information. For example, an electronic mail service stores emails sent and received using each account. When creating an account for a user, the user provides credentials such as a user principal name (e.g., electronic mail address) and password. The user principal name ("UPN") typically uniquely identifies the account, and the password is used to authenticate the user when the user later signs in to the account.

Many services employ an identity provider service to perform the authentication of users. When an account is created, the service directs the user to the identity provider service to input their UPN and password for the account. The identity provider service maintains a database or user store of user credentials for the service. When the user subsequently wants to access the account, the service directs the user to the identity provider service. The user provides the credentials to the identity provider service. The identity provider service verifies the credentials against those in the database. If the credentials are verified, the identity provider service provides to the service a security token for the account (e.g., indirectly via the device of the user). The security token is signed by the identity provider service and is evidence that the user has been authenticated as providing the proper credentials for the account. The service can check the signature of the security token to determine that it was signed by the identity provider service and check the content of the security token to confirm that the user has been authenticated. The service then allows the user to access the account.

In a cloud data center, the services of many different organizations may be hosted. Such organizations are referred to as tenants of the cloud data center. An example tenant may be a home improvement company that has retail stores. The cloud data center may host an inventory application for the home improvement company for its retail employees to access inventory information via kiosks (e.g., computers with Internet access) within the stores. To access the inventory application, an employee would need to sign in to the inventory application. In some cases, tenants delegate the sign-in process to a sign-in portal of the cloud data center. When the sign-in portal is used, an account would need to be created with a sign-in portal for each employee that needs to access the inventory application. The user principal name for an account may be an electronic mail address such as "john.doe@hic.com" where "hic.com" is the domain name of the home improvement company. The sign-in portal may delegate the authentication to an identity provider service. So, when an employee requests to sign-in the request is redirected to the identity provider service. The identity provider service can identify the tenant from the domain name and access the user store for the home improvement company to authenticate the employee based on the credentials. The identity provider then sends a security token for the employee to the sign-in portal to be used as evidence by the inventory application that the employee has been authenticated.

The use of credentials such as a UPN and password presents difficulties in certain situations. For example, during the springtime, the home improvement company may hire many seasonal workers. Although an account with a UPN and password may be created for each seasonal worker, such workers often have difficulty remembering their credentials. As another example, in some organizations, many of the employees may be considered "deskless" workers. A deskless worker is a worker who does not have a desk with a computer, such as a construction worker, a wait person, and so on. These deskless workers may still need to access certain applications of the organization, such as scheduling or payroll applications. These deskless workers may access their accounts so infrequently that it may be difficult for them to remember their credentials. When workers forget their credentials, it may lead to dissatisfied customers, loss of productivity, loss of revenue, and so on.

SUMMARY

A method and system performed by a computing system for signing in using personal identifiers (e.g., phone numbers) input via a sign-in portal that supports multiple tenants is provided. The system receives a sign-in request for a user that includes a personal identifier. The personal identifier uniquely identifies a person but does not include an identification of a tenant. The system performs a verification based on the personal identifier to authenticate the user. The system identifies, from a mapping, a tenant to which the personal identifier is mapped. The mapping maps personal identifiers of users to tenants. The system retrieves, from a user store for the tenant, user information relating to the user. The system then creates a security token based on the user information. If verification of the user was successful, the system sends the security token to the sign-in portal as evidence that the user has been authenticated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system are provided for authenticating users based on personal identifiers that are unique to each person and are tenant-independent. For example, a phone number is a personal identifier that uniquely identifies the person in possession of the telephone with that number. Also, a personal electronic mail address is a personal identifier that uniquely identifies the person with knowledge of the credentials for the electronic mail account. A phone number and a personal electronic mail address are also tenant-independent in that they do not by themselves uniquely identify a tenant, which is in contrast to a corporate electronic mail address with a domain name that can uniquely identify a tenant.

In some embodiments, a personal identifier identity provider ("PI-IP") system or service allows users to sign in to accounts of tenants using their personal identifiers rather than using the credentials, such as a UPN and password, that are associated with their accounts. The PI-IP system may provide a feature through which a user can associate their personal identifier with their account. For example, when a seasonal worker is provided with their UPN and password, the worker may access a management feature of the PI-IP system to associate their cell phone number with their account. The PI-IP system may maintain a mapping of each phone number to the tenants that the phone number is associated with. For example, a worker who works part-time for both a coffee shop and a restaurant may associate their phone number with an account of the coffee shop and an account of the restaurant when the coffee shop and restaurants are both tenants.

When a user requests to sign in via a sign-in portal, the sign-in portal may redirect the request to the PI-IP system. Upon receiving a sign-in request, the PI-IP system sends a sign-in user experience element (e.g., a dialog box) to the device of the user, which may prompt the user to enter their credentials or phone number. If the user enters their credentials, then the PI-IP system may authenticate the user using conventional techniques. If, however, the user enters their phone number, the PI-IP system authenticates the user using a phone-based authentication.

In some embodiments, to perform a phone-based authentication, the PI-IP system performs a phone-based verification using the phone number to authenticate the user. For example, the PI-IP may send a verification code via a messaging service addressed to the phone number such as via a short message service or a voice call and send a verification user experience element to the device through which the user entered their phone number. Upon receiving the verification code, the user enters the verification code via the verification user experience element to send the verification code to the PI-IP system. If the received verification code matches the one that was sent, then the PI-IP system has authenticated the user as having possession of the phone. The PI-IP system then may determine whether the user has an account with a tenant by checking a mapping of phone numbers to tenants. If the phone number is associated with a tenant, then the PI-IP system retrieves user information for an account from a user store for the tenant. The PI-IP system may then generate and send a security token to the sign-in portal (e.g., via the device, which redirects the security token to the sign-in portal). The sign-in portal can then complete the signing in of the user based on the authentication provided by security token.

In some embodiments, if the phone number is associated with multiple tenants, the PI-IP system may send a tenant selection user experience element to the user that lists the tenants and requests the user to select a tenant. The user can then select the tenant (e.g., coffee shop or restaurant) that the user wants to sign in to. To help preserve the privacy of the user, the PI-IP system may not send the selection user experience element until the user has been verified using the phone-based verification. If the PI-IP system were to send the tenant selection user experience element before the phone-based verification, then anyone in possession of the phone number could determine the tenants with which the user had an account, which may present privacy concerns.

Although the PI-IP system is described primarily in the context of using a phone number as the personal identifier, other personal identifiers can be used. For example, the personal identifier can be a personal electronic mail address, a government-issued identifier (e.g., electronic identifier, social security number, passport number, or driver's license number), a user-created unique identifier, and so on. Preferably, the personal identifier is easy for the user to remember. After a personal identifier is received, the PI-IP system may access the user store of the tenant to identify a mode for sending the verification code for the account associated with the phone number. For example, the mode may be an electronic mail address for sending a verification code or a phone number for sending the verification code via a short message service or a voice call.

Figure 1:
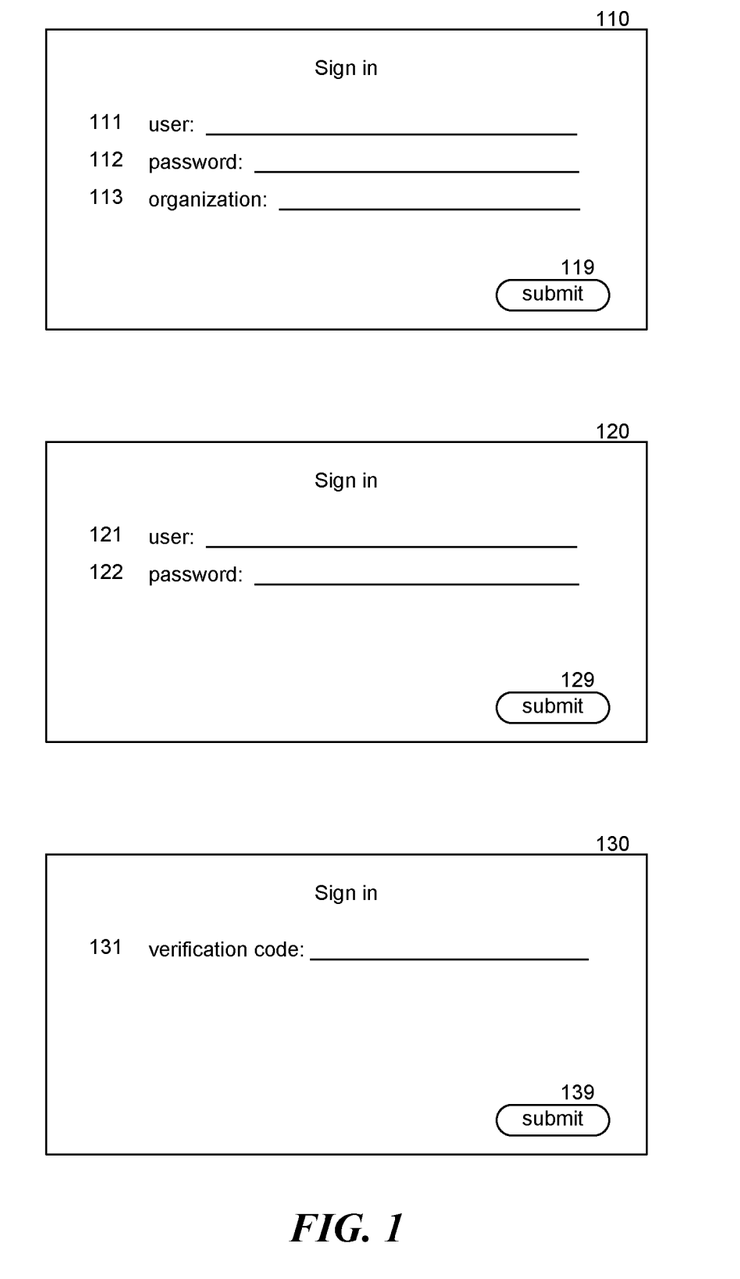
FIG. 1 illustrates user experience elements of the PI-IP system in some embodiments.

FIG. 1 illustrates user experience elements of the PI-IP system in some embodiments. A user experience element 110 is sent to a device of the user for input of the credentials. The user experience element 110 includes a user entry field 111, a password entry field 112, an organization entry field 113, and a submit button 119. The user experience element 110 allows the user to sign in by entering the UPN in the user entry field and password in the password entry field or a phone number in the user entry field without entering a password. The user experience element 110 allows the user to also specify an organization or tenant via the organization entry field in case the user has accounts with multiple tenants. The user then selects a submit button to submit the sign-in information.

A user experience element 120 is sent to a device of the user for input of the credentials and provides a simplified version of the user experience element 110. The user experience element 120 includes a user entry field 121, a password entry field 122, and a submit button 129. The user experience element 120 allows the user to sign in using a UPN and password or a phone number. The user experience element 120 does not allow the user to also specify an organization or tenant. Thus, if the user has accounts with multiple tenants, then PI-IP system will request the user to select a tenant after the phone-based verification. The user then selects a submit button to submit the sign-in information.

A user experience element 130 is sent to a device of the user for input of a verification code. The user experience element 130 includes a verification code entry field 131 and a submit button 139. Upon receiving a verification code, the user enters the verification code into the verification code entry field and selects the submit button.

Figure 2:
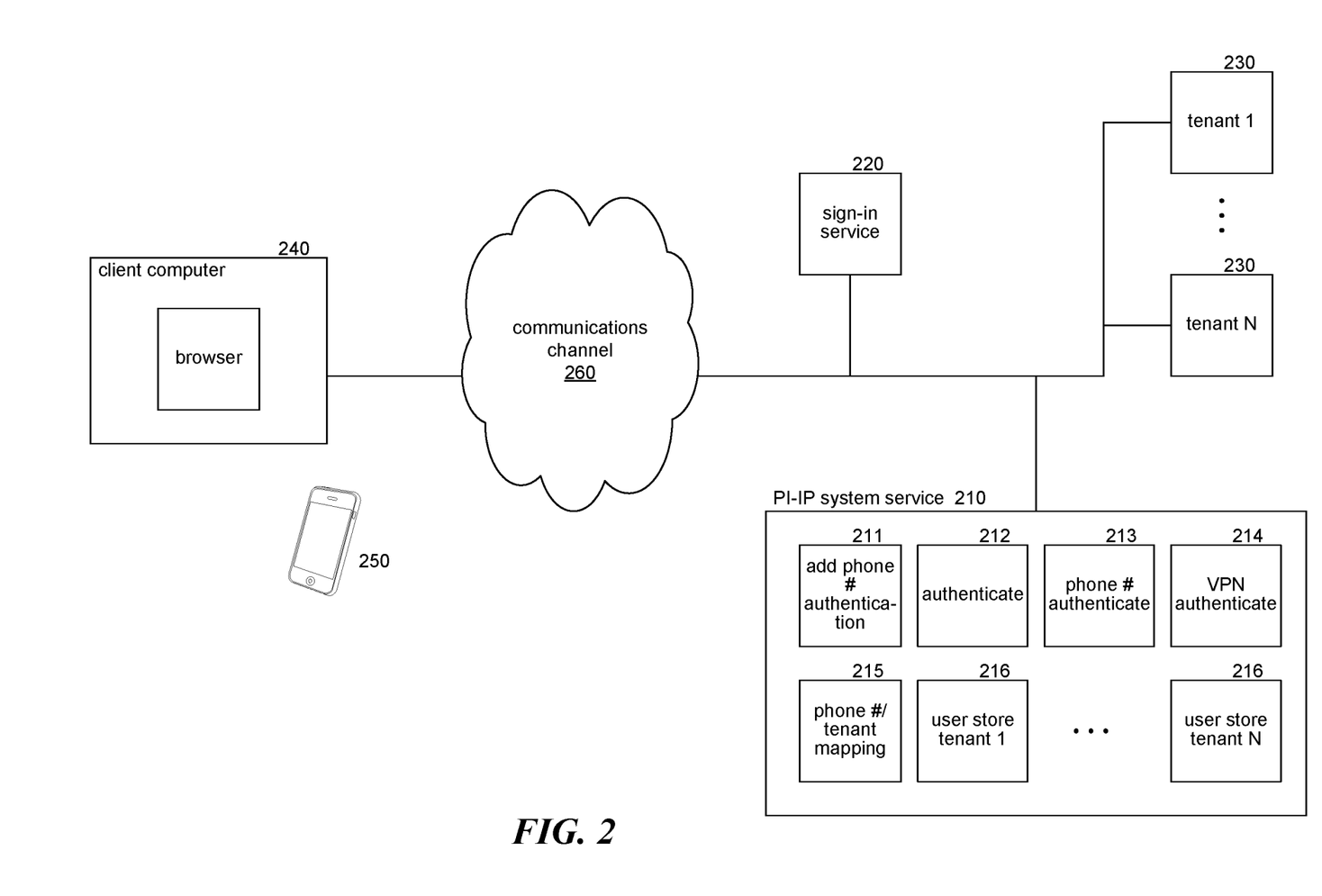
FIG. 2 is a block diagram that illustrates components of the PI-IP system in some embodiments.

FIG. 2 is a block diagram that illustrates components of the PI-IP system in some embodiments. A cloud data center may include a PI-IP system 210, a sign-in service 220, and various tenants 230 that are hosted on servers of the cloud data center. The cloud data center may be connected to client computers 240 via a communications channel 260. The PI-IP system may also be connected to a service (not illustrated) for sending short message service messages to phones such as phone 250. The PI-IP system includes an add phone number authentication component 211, an authenticate component 212, a phone number authenticate component 213, and a UPN authenticate component 214. The PI-IP system may also include a phone number to tenant mapping store 215 and, for each tenant, a user store 216. The add phone number authentication component coordinates the associating of a phone number with an account of the tenant. The authenticate component performs the authentication of a user and invokes either the phone number authenticate component or the UPN authenticate component, depending on whether the user supplied a phone number or a UPN and password. The phone number to tenant mapping store may map each phone number to the UPN of an account and a tenant or simply to a tenant. If mapped only to a tenant, the PI-IP system may need to search the user store for the tenant for the account associated with the phone number. To speed up processing, the user store may maintain an index mapping phone numbers to accounts. Alternatively, the PI-IP system may not use the phone number to tenant mapping store. In such a case, the PI-IP system would need to search the user stores for the account associated with a phone number. The communications channel may be a network such as the Internet.

The computing systems, also referred to as computer systems, used by the PI-IP system may include a central processing unit, input devices, output devices (e.g., display devices and speakers), storage devices (e.g., memory and disk drives), network interfaces, graphics processing units, accelerometers, cellular radio link interfaces, global positioning system devices, and so on. A computing system may include multiple devices such as servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the PI-IP system. The data transmission media are used for transmitting data via transitory, propagating signals or carrier waves (e.g., electromagnetism) via a wired or wireless connection.

The PI-IP system may be described in the general context of computer-executable instructions, such as program modules and components, executed by one or more computers, processors, or other devices. Generally, program modules or components include routines, programs, objects, data structures, and so on that perform tasks or implement data types. Typically, the functionality of the program modules may be combined or distributed as desired in various embodiments. Aspects of the PI-IP system may be implemented in hardware using, for example, an application-specific integrated circuit (ASIC).

Figure 3:
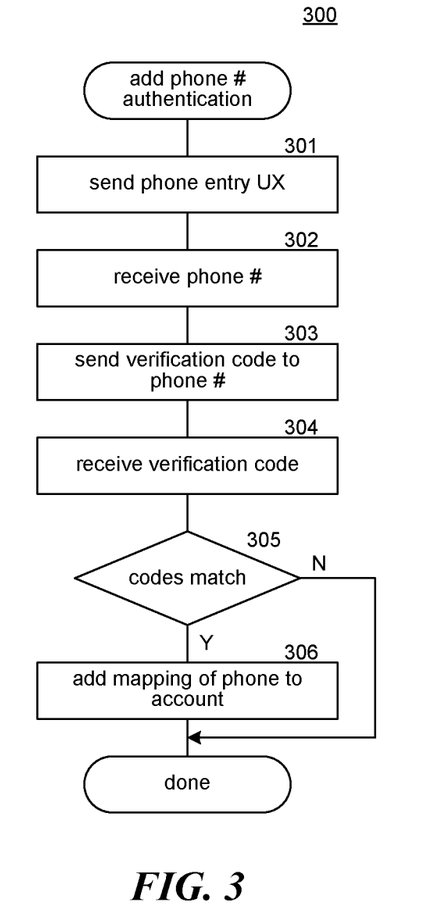
FIG. 3 is a flow diagram that illustrates the processing of an add phone number authentication component in some embodiments.

FIG. 3 is a flow diagram that illustrates the processing of an add phone number authentication component in some embodiments. An add phone number authentication component 300 is invoked to associate a phone number with an account of a tenant when requested by a user after the user has signed in to the account. In block 301, the component sends a phone number entry user experience element to the device of the user for entry of the phone number. In block 302, the component receives the phone number. In block 303, the component sends a verification code to the phone number. In block 304, the component receives the verification code that was input via a user experience element. In decision block 305, if the verification code that was sent matches the verification code that was received, then the component continues at block 306, else the component completes. In block 306, the component adds a mapping of the phone number to the account and then completes.

Figure 4:
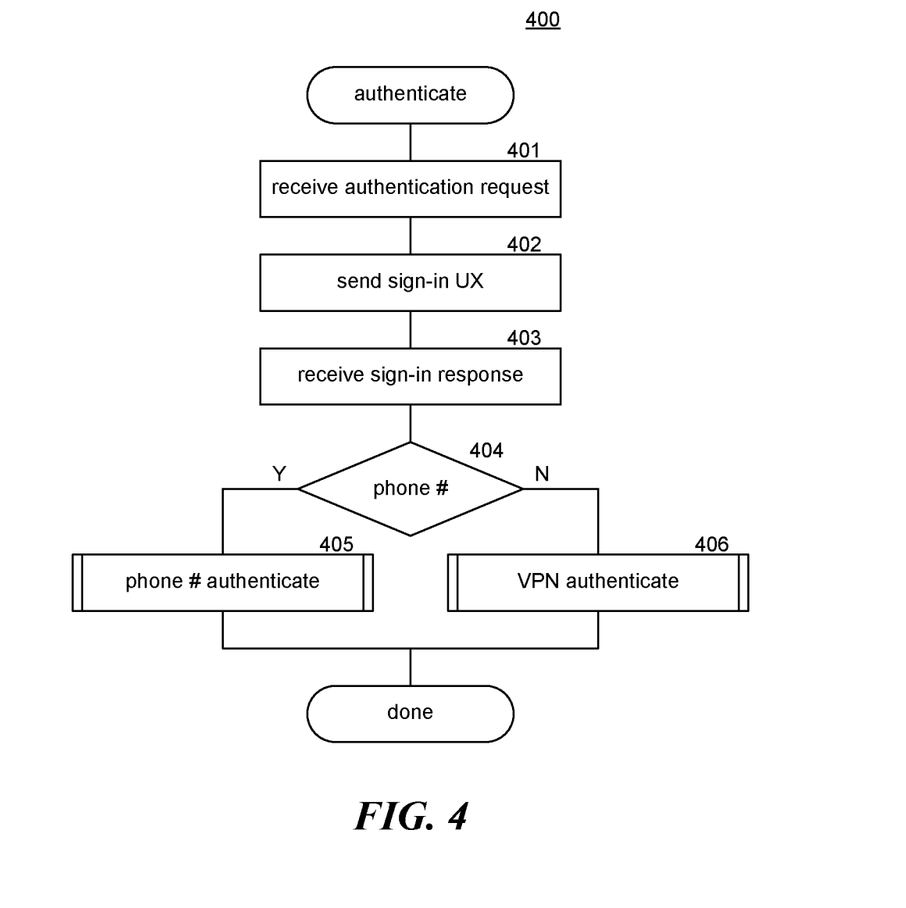
FIG. 4 is a flow diagram that illustrates the processing of an authenticate component of the PI-IP system in some embodiments.

FIG. 4 is a flow diagram that illustrates the processing of an authenticate component of the PI-IP system in some embodiments. An authenticate component 400 is invoked when the PI-IP system receives an authenticate request from a sign in-portal. In block 401, the component receives the authentication request. In block 402, the component sends a sign-in user experience element for the user to enter their credentials or phone number. In block 403, the component receives the sign-in response. In decision block 404, if a sign-in response includes a phone number, then the component continues at block 405, else the component continues at block 406. In block 405, the component invokes a phone number authenticate component to authenticate the phone number and completes. In block 406, the component invokes a UPN authenticate component to perform conventional authentication and then completes.

Figure 5:
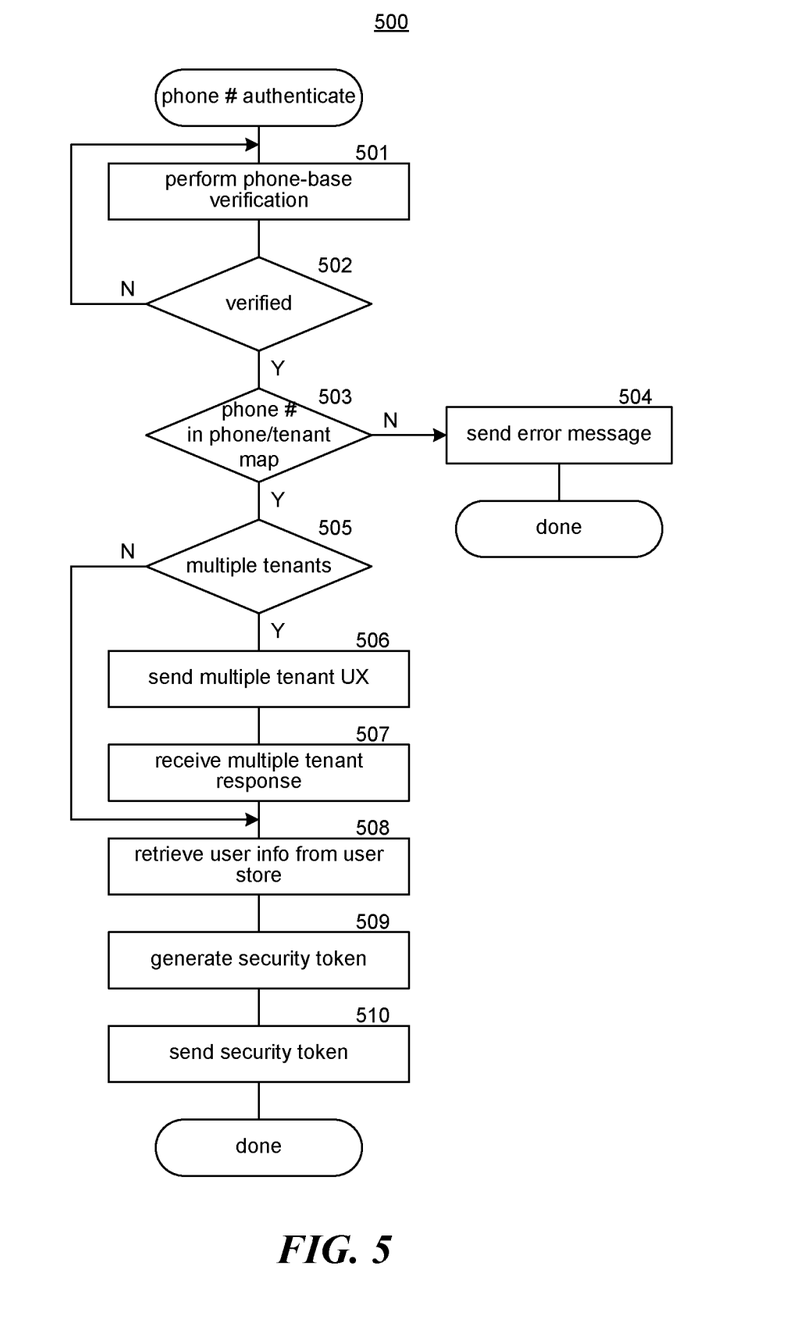
FIG. 5 is a flow diagram that illustrates the processing of a phone number authenticate component of the PI-IP system in some embodiments.

FIG. 5 is a flow diagram that illustrates the processing of a phone number authenticate component of the PI-IP system in some embodiments. A phone number authenticate component 500 is invoked when a user requests to be authenticated using a phone number. In block 501, the component performs a phone-based verification to verify that the user is in possession of the phone. In decision block 502, if the user is verified as being in possession of the phone, then the component continues at block 503, else the component loops to block 501 to retry the verification. In decision block 503, if the phone number is in the phone number to tenant mapping, then the component continues at block 505, else the component continues at block 504. In block 504, the component sends an error message to the user and then completes. In decision block 505, if the phone number is associated with multiple tenants, as indicated by the phone number to tenant mapping store, then the component continues at block 506, else the component continues at block 508. In block 506, the component sends a multiple tenant user experience element to the device of the user that requests the user to select one of the multiple tenants. In block 507, the component receives a multiple tenant response that identifies a tenant. In block 508, the component retrieves user information from the user store for the tenant that is associated with the phone number. In block 509, the component generates a security token for the user associated with the account. In block 510, the component sends the security token to the sign-in portal to complete the sign-in of the user and then completes.

The following paragraphs describe various embodiments of aspects of the PI-IP system. An implementation of the PI-IP system may employ any combination of the embodiments. The processing described below may be performed by a computing device with a processor that executes computer-executable instructions stored on a computer-readable storage medium that implements the PI-IP system.

A method performed by a computing system is provided. The method receives a sign-in request for a user. The sign-in request includes a personal identifier wherein the personal identifier uniquely identifies a person. The method performs a verification based on the personal identifier to authenticate the user. The method identifies from a mapping a tenant to which the personal identifier is mapped, wherein the mapping maps personal identifiers of users to tenants. The method retrieves, from a user store for the tenant, user information relating to the user. The method creates a security token based on the user information. After successful verification of the user, the method sends the security token as evidence that the user has been authenticated. In some embodiments, when the personal identifier is mapped to multiple tenants, the method receives from the user a selection of a tenant for which the user is to be authenticated. In some embodiments, the personal identifier is a phone number. In some embodiments, the performing of the verification includes sending a verification code addressed to the phone number. In some embodiments, the verification code is sent via a short message service message. In some embodiments, the verification code is sent via a phone call. In some embodiments, the personal identifier is a government-issued identifier. In some embodiments, the verification includes sending an electronic message to an address associated with the personal identifier. In some embodiments, the mapping of personal identifiers of users to a tenant is stored as part of the user store for that tenant. In some embodiments, the identifying of the tenant to which the personal identifier is mapped includes accessing user stores of tenants to determine tenants to which the personal identifier is mapped.

In some embodiments, a computing system is provided that includes one or more computer-readable storage media and one or more processors for executing the computer-executable instructions stored in the one or more computer-readable storage media. The storage media stores a mapping of personal identifiers to tenants, each personal identifier uniquely identifying a person. The storage media stores computer-executable instructions that, when executed, control the computing system to receive a sign-in request for a user, the sign-in request including a personal identifier. The instructions further control the computing system to send a verification request to the user via a service associated with the personal identifier. The instructions further control the computing system to identify from the mapping a tenant to which the personal identifier is mapped. The instructions further control the computing system to retrieve, from a user store for the tenant, user information relating to the user. The instructions further control the computing system to, after receiving a response to the verification request that verifies the user, send a security token as evidence that the user has been authenticated. In some embodiments, the computer-executable instructions further, when executed, control the computing system to, when the personal identifier is mapped to multiple tenants, and after receiving the response to the verification request that verifies the user, receive from the user a selection of a tenant for which the user is to be authenticated. In some embodiments, the computer-executable instructions further, when executed, control the computing system to, when the personal identifier is mapped to multiple tenants, and after receiving the response to the verification request that verifies the user, send to the user a request to select one of the multiple tenants. In some embodiments, the mapping of personal identifiers to a tenant is stored as part of the user store for that tenant. In some embodiments, the computer-executable instructions that identify the tenant to which the personal identifier is mapped access user stores of tenants to determine tenants to which the personal identifier is mapped. In some embodiments, the computer-executable instructions further, when executed, control the computing system to create a security token based on the user information.

In some embodiments, one or more computer-readable storage media that store computer-executable instructions is provided. The computer-executable instructions include instructions to receive a sign-in request for a user, the sign-in request including a phone number. The computer-executable instructions include instructions to send a verification request via a messaging service associated with the phone number. The computer-executable instructions include instructions to identify, from a mapping of phone numbers to tenants, a tenant to which the phone number is mapped. The computer-executable instructions include instructions to retrieve, from a user store for the tenant, user information relating to the user. The computer-executable instructions include instructions to, after receiving a response to the verification request that verifies the user, send to a service of the tenant a security token as evidence that the user has been authenticated. In some embodiments, the computer-executable instructions further include instructions to, when the phone number is mapped to multiple tenants, and after receiving the response to the verification request that verifies the user, receive from the user a selection of a tenant for which the user is to be authenticated. In some embodiments, the computer-executable instructions further include instructions to, when the phone number is mapped to multiple tenants, and after receiving the response to the verification request that verifies the user, send to the user a request to select one of the multiple tenants. In some embodiments, the instructions to identify the tenant to which the phone number is mapped include instructions to access user stores of tenants to determine tenants to which the phone number is mapped.

In some embodiments, one or more computer-readable storage media is provided that store computer-executable instructions. The computer-executable instructions include instructions to receive a sign-in request for a user, the sign-in request including a personal electronic mail address. The computer-executable instructions include instructions to send a verification request addressed to the personal electronic mail address. The computer-executable instructions include instructions to identify, from a mapping of personal electronic mail addresses to tenants, a tenant to which the personal electronic mail address is mapped. The computer-executable instructions include instructions to retrieve, from a user store for the tenant, user information relating to the user. The computer-executable instructions include instructions to, after receiving a response to the verification request that verifies the user, send to a service of the tenant a security token as evidence that the user has been authenticated.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system, the method comprising:
   receiving a sign-in request for a user to access a service hosted on a cloud data center, the sign-in request including a personal identifier, wherein the personal identifier uniquely identifies a person without a user name and is tenant independent;
   performing a verification based on the personal identifier to authenticate the user;
   mapping the personal identifier to multiple tenants hosted by the cloud data center;
   receiving from the user a selection of a select tenant of the multiple tenants for which the user is to be authenticated;
   retrieving user information relating to the user from data of the select tenant;
   creating a security token based on the user information; and
   after successful verification of the user, sending the security token as evidence that the user has been authenticated.

2. The method of claim 1 wherein the personal identifier is a phone number.

3. The method of claim 2, further comprising: sending a verification code addressed to the phone number to verify the user.

4. The method of claim 3 wherein the verification code is sent via a short message service message.

5. The method of claim 3 wherein the verification code is sent via a phone call.

6. The method of claim 1 wherein the personal identifier is a government-issued identifier.

7. The method of claim 1 wherein the verification includes sending an electronic message to an address associated with the personal identifier.

8. The method of claim 1 wherein the mapping of personal identifiers of users to a tenant is stored as part of the user store for that tenant.

9. The method of claim 8, wherein the personal identifier is a personal email account having a domain name that is tenant independent.

10. A computing system comprising:
at least one processor and a memory;
the memory including computer-executable instructions that, when executed on the at least one processor, control the computing system to:
receive a sign-in request for a user to access services hosted in a cloud data center, the sign-in request including a personal identifier that is tenant independent, the personal identifier other than a user name;
send a verification request to the user via a telecommunications service associated with the personal identifier to verify that the user performed the sign-in request;
perform a mapping of the personal identifier to multiple tenants hosted by the cloud data center;
receive from the user a selection of an intended tenant for which the user is to be authenticated;
retrieve, from a user store for the select tenant, user information relating to the user; and
after receiving a response to the verification request that verifies the user, send a security token as evidence that the user has been authenticated.

11. The computing system of claim 10 wherein the computer-executable instructions further, when executed, control the computing system to, when the personal identifier is mapped to multiple tenants, and after receiving the response to the verification request that verifies the user, send to the user a request to select one of the multiple tenants.

12. The computing system of claim 10 wherein the mapping of personal identifiers to a tenant is stored as part of the user store for that tenant.

13. The computing system of claim 12 wherein the computer-executable instructions that identify the tenant to which the personal identifier is mapped includes accessing user stores of tenants to determine tenants to which the personal identifier is mapped.

14. The computing system of claim 10 wherein the computer-executable instructions further, when executed, control the computing system to:
create a security token based on the user information.

15. A device, comprising:
at least one processor and a memory;
wherein the at least one processor is configured to:
receive a sign-in request for a user to access a service of a tenant hosted on a cloud data center, the sign-in request including a phone number;
send a verification request via a telecommunication service associated with the phone number to verify that the user is in possession of a phone associated with the phone number;
map the user to a plurality of tenants;
receive from the user a select one of the plurality of tenants;
retrieve, from a user store for the select tenant, user information relating to the user; and
after receiving a response to the verification request that verifies the user, send to a service of the select tenant a security token as evidence that the user has been authenticated.

16. The device of claim 15, wherein the at least one processor is further configured to: when the phone number is mapped to multiple tenants, and after receiving the response to the verification request that verifies the user, send to the user a request to select one of the multiple tenants.

17. The device of claim 15, wherein the at least one processor is further configured to: access user stores of tenants to determine tenants to which the phone number is mapped.

18. A system, comprising:
one or more processors coupled to a memory;
the one or more processors performing actions that:
obtain a sign-in request for a user to access a service hosted by a cloud data center, the sign-in request including a personal electronic mail address that is tenant independent;
send a verification request addressed to the personal electronic mail address to verify that the user initiated the sign-in request;
map the personal electronic mail address to multiple tenants;
receive a select tenant from the user;
retrieve, from a user store for the select tenant, user information relating to the user; and
after receiving response to the verification request that verifies the user, send to a service of the select tenant a security token as evidence that the user has been authenticated.

\* \* \* \* \*